Figure 1:
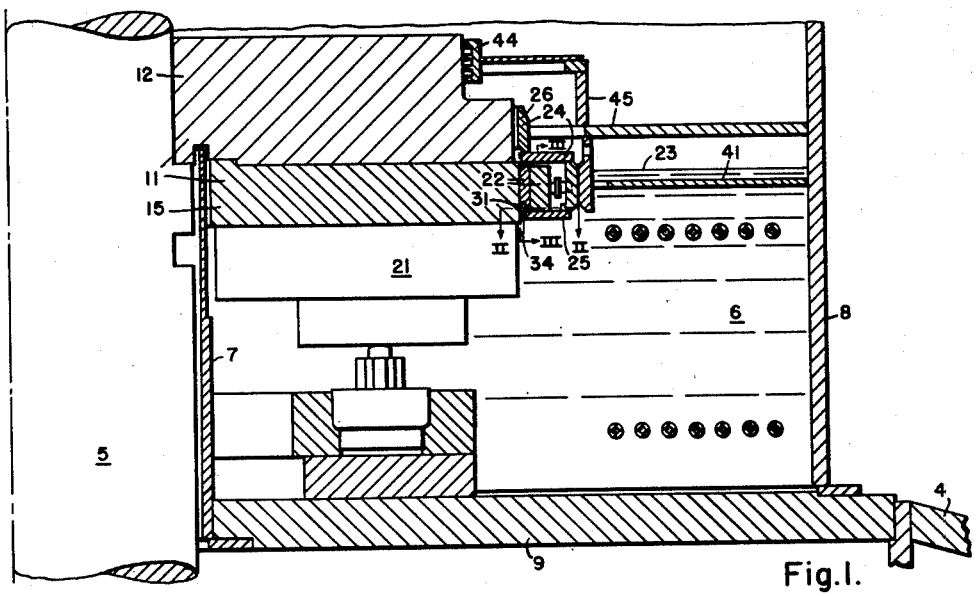

April 9, 1957  R. A. BAUDRY ET AL  2,788,251

BEARINGS

Filed March 25, 1955

WITNESSES
Edwin E. Bassler
Leon M. Garman

INVENTORS
René A. Baudry &
Garfield E. Peterson
BY O.B. Buchanan
ATTORNEY

United States Patent Office 2,788,251
Patented Apr. 9, 1957

2,788,251
BEARINGS

René A. Baudry and Garfield E. Peterson, Pittsburgh, Pa., assignors to Westinghouse Electric Corporation, East Pittsburgh, Pa., a corporation of Pennsylvania Application March 25, 1955, Serial No. 496,666

4 Claims. (Cl. 308—160)

Our invention relates to bearings for large vertical-shaft waterwheel generators and other machines, and it has particular relation to a combined thrust and guide-bearing assembly.

Our invention was developed for the purpose of overcoming several unexplained thrust-bearing failures which have recently occurred. Observations showed that considerable aeration of the oil occurred, in the guide-bearing area. This aerated oil was circulated through the oil-pot, thus reaching the thrust-bearing. Aerated oil in a thrust-bearing will increase the operating-temperatures, reduce the thickness of the oil-film during operation, and in general, it will make the bearing marginal in operation.

Our tests disclosed that there was a considerable foaming and agitation at the guide-bearing part of the assembly, and that the design of the guide-bearing, and the baffles surrounding it, had to be such that turbulence at this point would be kept at a minimum, to prevent excessive mixing of oil with air. We found that aerated oil causes foaming during full-speed operation of the machine; and we also found that, at low speed, during a shut-down operation, or during a start made shortly after a shutdown, the tiny air-bubbles which had accumulated throughout the body of the oil during running, rapidly rise to the undersurface of the thrust-bearing runner, where large bubbles are formed, causing trouble in themselves, and also aggravating any troublesome condition caused by dirt or high temperature.

We have developed a new viscosity-pump-pressurized, sealed, guide-bearing. A viscosity pump, built into the guide-bearing shoes, is used to provide a pressurized oil-supply in the guide-bearing part of the assembly, and adequate seals are provided for containing this pressurized oil and thus preventing foaming and aeration of the oil in the guide-bearing. The circulation of oil through the guide-bearing is thus closely controlled, and laminar circulation of oil is maintained in the guide-bearing. In this way, we have facilitated the lubrication of both the guide-bearing and the thrust-bearing of the assembly.

Figure 2:
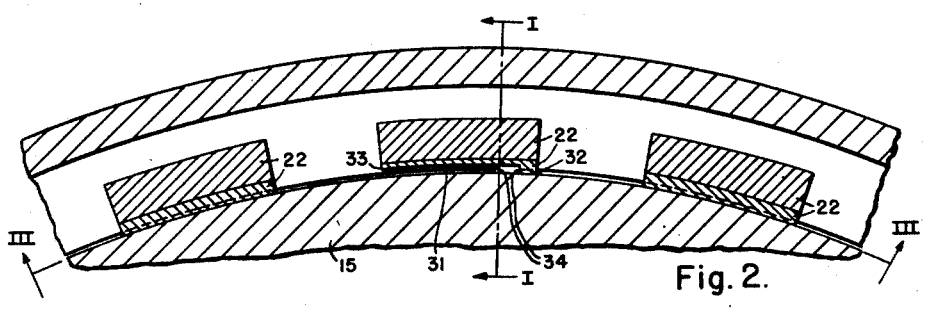
Figure 3:
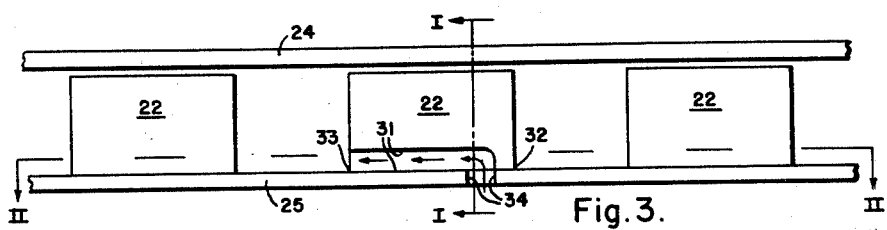

An exemplary form embodiment of our invention is shown in the accompanying drawing, which is considerably simplified for purposes of illustration, and which is not drawn to scale. In the drawing, Figure 1 is a vertical sectional view of the bearing-part of a vertical-shaft machine, as seen on a section-plane such as is indicated at I—I in Figs. 2 and 3;

Fig. 2 is a partial transverse or horizontal section through the guide-bearing part of the assembly, as seen on a section-plane such as is indicated at II—II in Figs. 1 and 3; and Fig. 3 is a fragmentary outwardly-looking development of the face-portions of the guide-bearing shoes, looking outwardly away from the surface of the guide-bearing runner, as seen from the cylinder which is indicated at III—III in Figs. 1 and 2.

In Fig. 1, we have shown a foam-suppressing combined thrust and guide-bearing assembly, for the top end of a vertical-shaft waterwheel generator. The generator has a stator member which is represented by an upper bracket 4 which is shown fragmentarily at the bottom of Fig. 1, and a rotor member which is represented by a vertical shaft 5. The frame-bracket 4 serves as a stationary supporting-structure which supports an oil-pot 6, which comprises an inner standpipe 7 and an outer standpipe 8, both mounted on top of the top-plate 9 of the bracket 4. The inner standpipe 7 surrounds the shaft 5, with a small space therebetween.

Near the upper end of the shaft 5, there is provided a runner-member 11, which is shown in two separate parts by way of illustration. The upper part of the runner-member is a thrust-block 12 which is carried by, and rotates with, the shaft 5. Secured to, and abutting up against, this thrust-block 12, is a runner 15, having an under portion which serves as a thrust-bearing runner which is spaced from the shaft 5. The runner 15 also has a peripheral portion which serves as a guide-bearing runner. It will be noted that the upper part of the inner standpipe 7 extends up above the oil-level, and up into the space between the shaft 5 and the thrust-bearing runner, in spaced relation to both the shaft and the thrust-bearing runner.

The supporting-structure, including the frame-bracket 4 and the oil-pot 6, carries a plurality of spaced thrust-bearing shoes 21, and a plurality of spaced guide-bearing shoes 22. Each of the thrust-bearing shoes 21 has an upper face-portion which bears on the thrust-bearing part of the runner 15. Each of the guide-bearing shoes has an arcuate face-portion which bears on the guide-bearing part of the runner 15. The oil-pot 6 carries oil 23 at a level which is shown as being above the center-line of the guide-bearing shoes 22, and slightly below the topmost portions of said guide-bearing shoes. The bottom of the oil-pot 6 is of course below the thrust-bearing shoes 21.

Our invention has to do particularly with improvements in the guide-bearing part of the assembly, for the purpose of preventing or substantially reducing the aeration of the oil which has heretofore occurred at this point. We provide a stationary pressure-withstanding enclosure which completely closes the space occupied by the guide-bearing shoes 22. This enclosure includes top and bottom enclosure-portions 24 and 25. The top enclosure-portion 24 is shown as including an upstanding ring 26 having a bore-portion which is disposed above the topmost portions of the guide-bearing shoes 22, and which extends at least partially above the oil-level in the oil-pot 6, said bore-portion having an oil-leakage-inhibiting fit or close spacing with respect to the rotating runner-member 11. The bottom enclosure-portion 25 is spaced above the bottom of the oil-pot. This bottom enclosure-portion 25 has an oil-leakage-inhibiting fit or close spacing with respect to the bottoms of the guide-bearing shoes 22, and it also has an oil-leakage-inhibiting fit or close spacing with respect to the periphery of the rotating runner-member 15. The clearances of the leakage-inhibiting fits between the runner-member 15 and the guide-bearing enclosure must necessarily be larger than the bearing-clearance of the guide-bearing shoes 22.

In accordance with our present invention, we pressurize this guide-bearing enclosure by means of a viscosity-pump in which the rotating runner 15 drags oil through an arcuate groove in the face of a stationary part which fits close to the runner, in a lower part of the guide-bearing assembly. In our illustrated preferred form of embodiment, this viscosity-pump is obtained by providing some or all of the guide-bearing shoes 22 with an arcuate horizontal groove 31 in their respective face-portions, near the lowermost part of said face-portions. As shown in Figs. 2 and 3, this horizontal groove 31 begins at a point spaced slightly away from the leading edge 32 of the shoe, and extends around to, or communicates with, the trailing edge 33 of the shoe. We also provide the bottom enclosure-portion 25 with a vertical slot or other oil-communicating intake-means 34, which connects the beginning of the horizontal groove 31 to the oil underneath the guide-bearing enclosure. The level of the oil 23 must thus be materially higher than the oil-intake of the viscosity-pump of the guide-bearing assembly. In general, the oil-level will not be substantially higher than the topmost portions of the guide-bearing shoes 22.

The arcuate horizontal grooves 31, which are provided in some or all of the guide-bearing shoes 22, thus serve as a viscosity pump which drags oil through these grooves by reason of the rotating movement of the runner 15. By this or equivalent means, we feed the guide-bearing enclosure with oil under pressure, which escapes upwardly through the bore of the ring-portion 26 of the top enclosure-portion 24. This escaping oil then flows downwardly over the top enclosure-portion 24, and finds its way back to the oil in the oil-pot 6.

In order to give our aeration-inhibiting pressurized enclosure its greatest effectiveness, it is quite desirable to use a particularly effective form of oil-pot baffling, particularly near the top of the oil in the oil-pot 6. Such baffling has been known before, but ordinarily the completeness of the baffling has not been carried to the extremes which we have found desirable for use in our pressurized sealed guide-bearing assembly. It will be understood that the oil in the oil-pot is swirling around at a rather rapid rate, during the operation of the machine, due to the oil-dragging effects of the rotating runner 15. If not prevented or restrained by suitable baffling, this rapidly rotating oil would pile up high around the periphery of the oil-pot, and would reduce its level in the vicinity of the guide-bearings, and at other more centrally located points.

We prevent this disturbance in the oil-level by providing a particularly large horizontal baffle-plate 41 which is disposed about an inch, more or less, beneath the oil-level. The outer periphery of this baffle 41 is secured to the outer standpipe 8 of the oil-pot 6. The inner edge of the baffle 41 is a large bore which has only a relatively small clearance from the outer periphery of the guide-bearing assembly, as shown in Fig. 1. The result of this baffling 41, is that the one-inch thickness of oil above the baffle is relatively quiet or quiescent, thus providing a quiet body of oil into which the overflow from the pressurized guide-bearing enclosure can drain, with a minimum amount of aeration. The baffle also prevents the oil-level in the region of the guide-bearing from falling too low for the proper lubrication of the guide-bearing.

Over the top of our bearing-assembly, we provide the usual top-enclosure for the machine, including an air-and-vapor seal 44, and a top-structure 45, as well as some additional top-cover means which has not been illustrated, as forming no part of our present invention.

In operation, our pressure-withstanding means are parts having a sufficiently loose fit to inhibit, or interpose resistance against, oil-leakage through the fit. These pressure-withstanding fits are well known in and of themselves, as is also the viscosity pump in the form of a groove in the bearing-surface between two relatively moving parts, so that the sliding of one part with respect to the other will drag along the oil within said groove, so as to create a certain oil-flow at a certain oil-pressure. Our present invention combines these two elements in a combination which includes a means for providing an oil-tight enclosure which is able to hold the oil-pressure thus created, by enclosing the spaces above, below, around, and between the spaced guide-bearing shoes 22. In this way, our guide-bearing space is kept full of oil, at a slight pressure above atmospheric, so that laminar oil-flow is obtained through the guide-bearing seals, and air is excluded, thus preventing aeration of the oil. This not only improves the performance of the vertical-shaft guide-bearing structure itself, but it also, when embodied in a combined thrust and guide-shaft bearing for a vertical-shaft machine, prevents the aeration of the entire body of oil, which lubricates the thrust-bearing as well as the guide-bearing, thus overcoming previously experienced difficulties resulting in the failure of the thrust-bearing part of the combination.

While we have shown our invention in but a single illustrative form of embodiment, we wish it to be understood that the essential principles of the invention can be embodied in other structures, involving the substitution of equivalent parts, the omission of details which may not be wanted or needed in any particular case, and the addition of other details and refinements which will usually be needed, in accordance with known practices of the prior art. Our invention is particularly effective when used in a combined thrust and guide-bearing assembly which incorporates the improvements claimed in our Patent 2,626,192, granted January 20, 1953, in which aeration at the inner standpipe is prevented by suitable means.

We claim as our invention:

1. A pressurized, sealed, guide-bearing assembly for a vertical-shaft machine, comprising: a rotating runner-member having a peripheral portion which serves as a guide-bearing runner; a stationary supporting-structure; a plurality of spaced guide-bearing shoes carried by said supporting-structure, each of said guide-bearing shoes having an arcuate face-portion which bears on said guide-bearing runner; an oil-pot carried by said supporting-structure for holding oil at a level which is not substantially higher than the topmost portions of said guide-bearing shoes; means for providing a stationary pressure-withstanding guide-bearing enclosure which completely encloses the space occupied by said plurality of guide-bearing shoes; said enclosure including top and bottom enclosure-portions; said top enclosure-portion having a bore-portion which is disposed above the topmost portions of the guide-bearing shoes, and which extends at least partially above the oil-level in the oil-pot, said bore-portion having an oil-leakage-inhibiting fit with respect to said rotating runner-member; said bottom enclosure-portion being spaced above the bottom of said oil-pot, and having an oil-leakage-inhibiting fit with respect to the bottoms of said guide-bearing shoes, and having an oil-leakage-inhibiting fit with respect to said rotating runner-member; a viscosity-pump means, including a stationary arcuate horizontal groove and an oil-inlet means for said groove, in a lower part of the guide-bearing assembly, for causing the rotation of the runner-member to drag oil through said groove and into the guide-bearing enclosure; and said assembly including an overflow-means for returning oil from the top enclosure-portion to the oil-pot.

2. A foam-suppressing combined thrust and guide-bearing assembly for a vertical-shaft machine, comprising: a vertical rotating shaft; a rotating runner-member having a top portion which is carried by the shaft, and having an underportion which serves as a thrust-bearing runner which is spaced from the shaft, and having a peripheral portion which serves as a guide-bearing runner; a stationary supporting-structure; a plurality of spaced thrust-bearing shoes carried by said supporting-structure, each of said thrust-bearing shoes having an upper face-portion which bears on said thrust-bearing runner; a plurality of spaced guide-bearing shoes carried by said supporting-structure, each of said guide-bearing shoes having an arcuate face-portion which bears on said guide-bearing runner; an oil-pot carried by said supporting-structure for holding oil at a level which is not substantially higher than the topmost portions of said guide-bearing shoes; said oil-pot including an inner standpipe surrounding the shaft in spaced relation to the shaft, the upper part of the inner standpipe extending up above the oil-level and up into the space between the shaft and the thrust-bearing runner in spaced relation to both the shaft and the thrust-bearing runner, the bottom of the oil-pot being below the thrust-bearing shoes; means for providing a stationary pressure-withstanding guide-bearing enclosure which completely encloses the space occupied by said plurality of guide-bearing shoes; said enclosure including top and bottom enclosure-portions; said top enclosure-portion having a bore-portion which is disposed above the topmost portions of the guide-bearing shoes, and which extends at least partially above the oil-level in the oil-pot, said bore-portion having an oil-leakage-inhibiting fit with respect to said rotating runner-member; said bottom enclosure-portion having an oil-leakage-inhibiting fit with respect to the bottoms of said guide-bearing shoes, and having an oil-leakage-inhibiting fit with respect to said rotating runner-member; a viscosity-pump means, including a stationary arcuate horizontal groove and an oil-inlet means for said groove, in a lower part of the guide-bearing portion of the assembly, for causing the rotation of the runner-member to drag oil through said groove and into the guide-bearing enclosure; and said assembly including an overflow-means for returning oil from the top enclosure-portion to the oil-pot.

3. A pressurized, sealed, guide-bearing assembly for a vertical-shaft machine, comprising: a rotating runner-member having a peripheral portion which serves as a guide-bearing runner; a stationary supporting-structure; a plurality of spaced guide-bearing shoes carried by said supporting-structure, each of said guide-bearing shoes having an arcuate face-portion which bears on said guide-bearing runner; an oil-pot carried by said supporting-structure for holding oil at a level which is not substantially higher than the topmost portions of said guide-bearing shoes; means for providing a stationary pressure-withstanding enclosure which completely encloses the space occupied by said plurality of guide-bearing shoes; said enclosure including top and bottom enclosure-portions; said top enclosure-portion having a bore-portion which is disposed above the topmost portions of the guide-bearing shoes, and which extends at least partially above the oil-level in the oil-pot, said bore-portion having an oil-leakage-inhibiting fit with respect to said rotating runner-member; said bottom enclosure-portion being spaced above the bottom of said oil-pot, and having an oil-leakage-inhibiting fit with respect to the bottoms of said guide-bearing shoes, and having an oil-leakage-inhibiting fit with respect to said rotating runner-member; at least one of said guide-bearing shoes having an arcuate horizontal groove in its face-portion near the lowermost part of said face-portion, said horizontal groove beginning at a point spaced from the leading edge of that shoe and extending around into communication with the trailing edge of that shoe; the aforesaid bottom enclosure-portion having a vertical oil-communicating inlet-means, connecting the beginning of the aforesaid horizontal groove to the oil underneath said enclosure; and said assembly including an overflow-means for returning oil from the top enclosure-portion to the oil-pot.

4. A foam-suppressing combined thrust and guide-bearing assembly for a vertical-shaft machine, comprising: a vertical rotating shaft; a rotating runner-member having a top portion which is carried by the shaft, and having an underportion which serves as a thrust-bearing runner which is spaced from the shaft, and having a peripheral portion which serves as a guide-bearing runner; a stationary supporting-structure; a plurality of spaced thust-bearing shoes carried by said supporting-structure, each of said thrust-bearing shoes having an upper face-portion which bears on said thrust-bearing runner; a plurality of spaced guide-bearing shoes carried by said supporting-structure, each of said guide-bearing shoes having an arcuate face-portion which bears on said guide-bearing runner; an oil-pot carried by said supporting structure for holding oil at a level which is not substantially higher than the topmost portions of said guide-bearing shoes; said oil-pot including an inner standpipe surrounding the shaft in spaced relation to the shaft, the upper part of the inner standpipe extending up above the oil-level and up into the space between the shaft and the thrust-bearing runner in spaced relation to both the shaft and the thrust-bearing runner, the bottom of the oil-pot being below the thrust-bearing shoes; means for providing a stationary pressure-withstanding enclosure which completely encloses the space occupied by said plurality of guide-bearing shoes; said enclosure including top and bottom enclosure-portions; said top enclosure-portion having a bore-portion which is disposed above the topmost portions of the guide-bearing shoes, and which extends at least partially above the oil-level in the oil-pot, said bore-portion having an oil-leakage-inhibiting fit with respect to said rotating runner-member; said bottom enclosure-portion having an oil-leakage-inhibiting fit with respect to the bottoms of said guide-bearing shoes, and having an oil-leakage-inhibiting fit with respect to said rotating runner-member; at least one of said guide-bearing shoes having an arcuate horizontal groove in its face-portion, near the lowermost part of said face-portion, said horizontal groove beginning at a point spaced from the leading edge of that shoe and extending around into communication with the trailing edge of that shoe; the aforesaid bottom enclosure-portion having a vertical oil-communicating inlet-means, connecting the beginning of the aforesaid horizontal groove to the oil underneath said enclosure; and said assembly including an overflow-means for returning oil from the top enclosure-portion to the oil-pot.

References Cited in the file of this patent
UNITED STATES PATENTS

| | | |
|---|---|---|
| 1,760,904 | Howarth | June 3, 1930 |
| 2,626,192 | Baudry et al. | Jan. 20, 1953 |